(12) United States Patent
Plzak (10) Patent No.: US 9,212,681 B2
(45) Date of Patent: Dec. 15, 2015

(54) FASTENING DEVICE (71) Applicant: George John Plzak, Madison, WI (US)

(72) Inventor: George John Plzak, Madison, WI (US)

(*) Notice: Subject to any disclaimer, the term of this patent is extended or adjusted under 35 U.S.C. 154(b) by 163 days.

(21) Appl. No.: 13/853,006

(22) Filed: Mar. 28, 2013

(65) Prior Publication Data

US 2014/0294532 A1     Oct. 2, 2014

(51) Int. Cl.
*F16B 21/12* (2006.01)
*F16B 21/16* (2006.01)

(52) U.S. Cl.
CPC .............. *F16B 21/125* (2013.01); *F16B 21/16* (2013.01)

(58) Field of Classification Search
USPC .................... 411/347–349, 351, 355
See application file for complete search history.

(56) References Cited

U.S. PATENT DOCUMENTS

| | | | | |
|---|---|---|---|---|
| 2,204,116 A | * | 6/1940 | Blocher | 411/347 |
| 3,046,827 A | * | 7/1962 | Myers | 411/348 |
| 3,390,712 A | * | 7/1968 | McKay | 411/265 |
| 3,554,075 A | * | 1/1971 | Johnson | 411/349 |
| 4,221,252 A | | 9/1980 | Bruce | |
| 4,278,120 A | | 7/1981 | Hart et al. | |
| 4,297,063 A | | 10/1981 | Hart | |
| 4,655,657 A | | 4/1987 | Duran | |
| 4,840,528 A | * | 6/1989 | Doom | 411/351 |
| 6,357,955 B1 | | 3/2002 | Hoffmann et al. | |
| 7,413,369 B2 | | 8/2008 | Kienzler | |
| 7,416,362 B2 | | 8/2008 | North | |
| 2003/0012621 A1 | | 1/2003 | Fletcher | |
| 2004/0033105 A1 | | 2/2004 | North | |
| 2011/0162176 A1 | | 7/2011 | Tylaska et al. | |

* cited by examiner

*Primary Examiner* — Flemming Saether
(74) *Attorney, Agent, or Firm* — Ariel S. Bentolila; Bay Area IP Group LLC (57) ABSTRACT

A device comprising a shaft and a fastener. The device requires substantially no tools to apply while generally maintaining the basic shape of a common clevis pin and the robustness of a common cotter pin. The fastener passes through a bore hole in the shaft. A cap positions onto a shaft head, and includes a ridge that engages a slot in the shaft head. The cap and head have low profiles and are non-protuberant, so as to minimize snagging, inadvertent release, and/or damage to contacting objects. A plunger positions inside the shaft, passing through a plunger spring. The plunger spring provides a compressive force that presses against the fastener to hold it in place. Removing the cap reduces the compressive force. The shaft cannot be released by external pressure on the shaft head. A compressive element helps secure the fastener in a shaft cross bore.

19 Claims, 7 Drawing Sheets

FASTENING DEVICE

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to fasteners. More particularly, the invention relates to a mechanical device comprising a clevis pin and a cotter pin substitute that typically requires no tools to apply.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Clevis pins may be used to connect a multiplicity of suitable items such as, but not limited to, the prongs of yokes of various different shapes, devises, chains, shackles, etc. Traditional clevis pins comprise a head, a shaft, and a pin hole. In typical use of a clevis pin, the shaft of the pin is inserted into holes in the item or items being fastened. The head generally prevents the pin from completely going through the holes. The other end of the pin is often held in place by a pin, such as, but not limited to, a cotter pin, a lock pin, or a spring loaded pin, inserted into the pin hole.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that current clevis pins may comprise various different means for being held in place including, without limitation, a common cotter pin, which may require tool(s) to apply. Other current clevis pins are grooved and comprise a retaining ring, which may require a tool to remove. Hairpin cotter pins may also be used. Some clevis pins may comprise a swivel-lock with a handle to operate the swivel mechanism. In some cases this handle may be quite prominent and, in certain situations, may be snagged thereby inadvertently releasing the pin or simply getting in the way. Other current clevis pins may be held in place by ring-snap cotter pins, clip style retaining cotter pins, or locking cotter pins. Due to the omnipresent danger of snagging, one may expect that sharp or prominent cotter pins or cotter pin substitutes may cause inadvertent release of the clevis pin or damage to contacting objects, for example, without limitation, fingers or toes. Furthermore, it is believed that these cotter pins or cotter pin substitutes are typically not secure from inadvertent release from external force on cotter pin or cotter pin substitute. Yet other current clevis pins may be held in place by cotter rings and split rings rather than pins, which may be difficult to use, especially in conditions of limited access and low light and may cause damage to a user's fingernails. Yet other current clevis pins may be implemented as locking, spring loaded clevis pins or spring loaded, retractable detent ball clevis pins. It is believed that these types of pins may require a critical working length or diameter in order to function, and inadvertent external (compressive) pressure on the head of the clevis pin may result in the unlocking of the clevis.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a side perspective view of the body, and FIG. 1B is a cross sectional side view of the body;

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

An embodiment of the present invention provides a mechanical device comprising a clevis pin and a cotter pin, typically requiring no tools to apply while generally maintaining the basic shape of a common clevis pin and the robustness of a common cotter pin. Some embodiments are implemented without a prominent clevis pin head that may be snagged so as to cause inadvertent release or damage to contacting objects, such as, but not limited to, the fingers and toes of users, or that may simply get in the way. In addition, some embodiments may be configured so that the clevis pin typically cannot be released by external (compressive) pressure on the clevis head. Moreover, some embodiments are typically easy to use even in conditions of limited access or low light, are not hard on users' fingernails, and do not have a critical working length or working diameter in order to function.

Figures 1A, 1B:
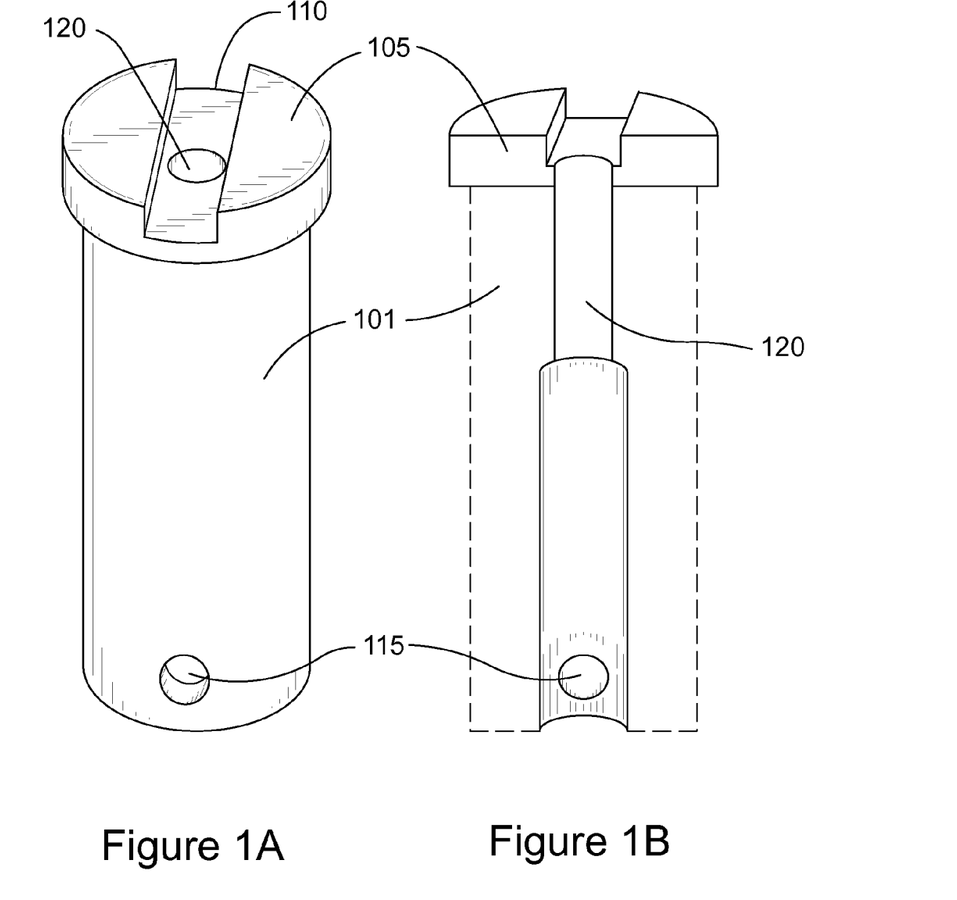
FIGS. 1A and 1B illustrate an exemplary clevis pin body, in accordance with an embodiment of the present invention.

FIGS. 1A and 1B illustrate an exemplary clevis pin body 101, in accordance with an embodiment of the present invention. FIG. 1A is a side perspective view of body 101, and FIG. 1B is a cross sectional side view of body 101. In the present embodiment, clevis pin body 101 comprises a head 105 with a slot 110 that is slightly wider and deeper than a ridge 205 on a clevis pin cap, as illustrated by way of example in FIG. 2. Body 101 also comprises a cross bore 115 near the bottom end of body 101 that is slightly larger than the maximum diameter of a fastener 401 for use with the clevis pin, as illustrated by way of example in FIG. 4. Fastener 401 may include, without limitation, a substitute cotter pin. A central axially oriented head bore 120 may be at the bottom end slightly larger than the maximum diameter of a plunger spring and plunger saddle 305, as shown by way of example in FIGS. 5, 6 and 7, and may be slightly larger at the top end than the diameter of a plunger shaft, as shown by way of example in FIG. 3.

Figure 2:
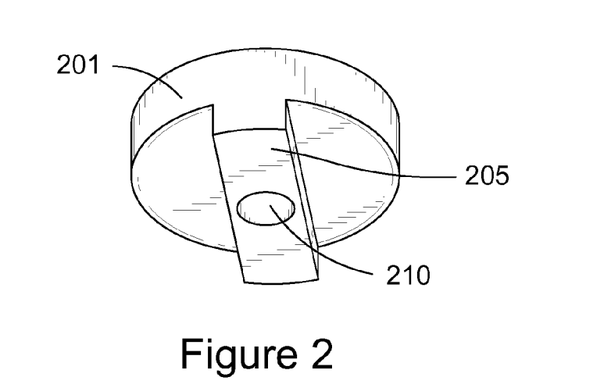
FIG. 2 is a bottom perspective view of an exemplary cap for a clevis pin, in accordance with an embodiment of the present invention

FIG. 2 is a bottom perspective view of an exemplary cap 201 for a clevis pin, in accordance with an embodiment of the present invention. In the present embodiment, cap 201 comprises a ridge 205 and a central axially oriented through cap bore 210. Ridge 205 is sized so that cap 201 may be easily fitted into a slot in a clevis pin head, as illustrated by way of example in FIGS. 1A and 1B. Cap bore 210 is sized so that cap 201 is press fitted onto the top portion of a plunger, as shown by way of example in FIG. 3. Cap 201 has a low profile and is non-protuberant, which may generally minimize snagging or simply getting in the way. It is contemplated that in some embodiments the cap may be implemented in a multiplicity of suitable shapes to mate with clevis pins comprising heads of various different shapes. For example, without limitation, in one embodiment the cap may comprise one or more round pegs that fit into a hole or holes on the head of the clevis pin. In other embodiments the cap and the head of the clevis pin may not fit together and, instead, may be connected by various different attachment means such as, but not limited to, adhesive or welding. Furthermore, the caps in some embodiments may have rounded tops rather than flat tops or may be rectangular, hexagonal, elliptical, etc. rather than circular. Moreover, in some embodiments the cap may be implemented without a bore into which a plunger may be inserted. In these embodiments the plunger and the cap may not be connected or may be connected by alternate means such as, but not limited to, adhesive or welding.

Figure 3:
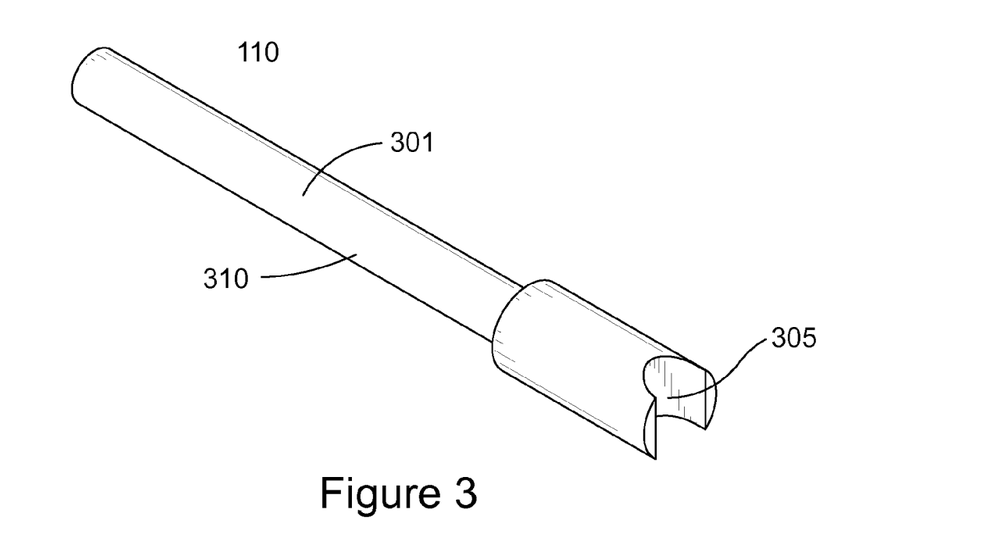
FIG. 3 is a side perspective view of an exemplary plunger for a clevis pin, in accordance with an embodiment of the present invention.

FIG. 3 is a side perspective view of an exemplary plunger 301 for a clevis pin, in accordance with an embodiment of the present invention. In the present embodiment, plunger 301 comprises a saddle 305 at the lower end sized to mate with a circumferential groove at the midpoint of a cotter pin substitute, as illustrated by way of example in FIG. 4, and a plunger shaft 310 of a diameter to fit freely though the inside diameter of a plunger spring, as illustrated by way of example in FIGS. 5, 6 and 7, and freely through the smaller diameter of a stepped through bore in a clevis pin body, as illustrated by way of example in FIGS. 1A and B. Plunger shaft 310 may also be sized to afford a press fit with a bore through a clevis pin cap, as illustrated by way of example in FIG. 2.

Figure 4:
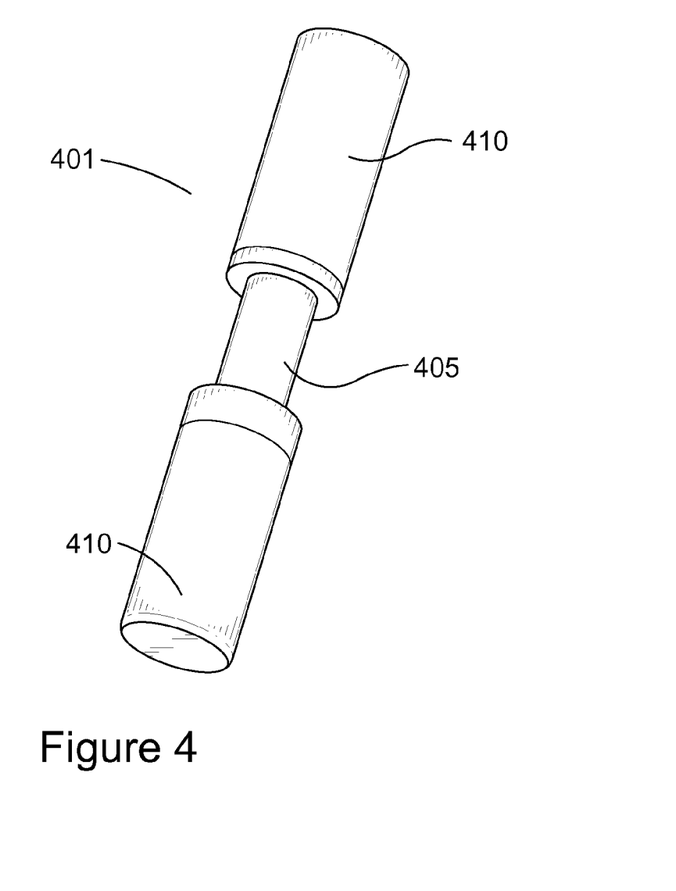
FIG. 4 is a side perspective view of an exemplary cotter pin substitute, in accordance with an embodiment of the present invention.

FIG. 4 is a side perspective view of an exemplary fastener 401, in accordance with an embodiment of the present invention. In the present embodiment, fastener 401 comprises a circumferential groove 405 near its midpoint that is typically wide enough and deep enough to receive a saddle end of a plunger, as shown by way of example in FIG. 3, and of sufficient length to significantly protrude from a cross bore in a clevis body, as illustrated by way of example in FIGS. 1A and 1B. In some instances this length may be approximately one and one half times the diameter of the clevis body. It is contemplated that cotter pin substitutes in some embodiments may be longer or shorter. In the present embodiment, fastener 401 is robust and comprises smooth ends 410 to generally avoid snagging or injury to persons or objects. Those skilled in the art will readily recognize, in light of and in accordance with the teachings of the present invention, that the ends of cotter pins in some alternate embodiments may be implemented in a multiplicity of suitable shapes. For example, without limitation, some cotter pin substitutes may comprise blunt ends or hemispherical ends.

Figure 5:
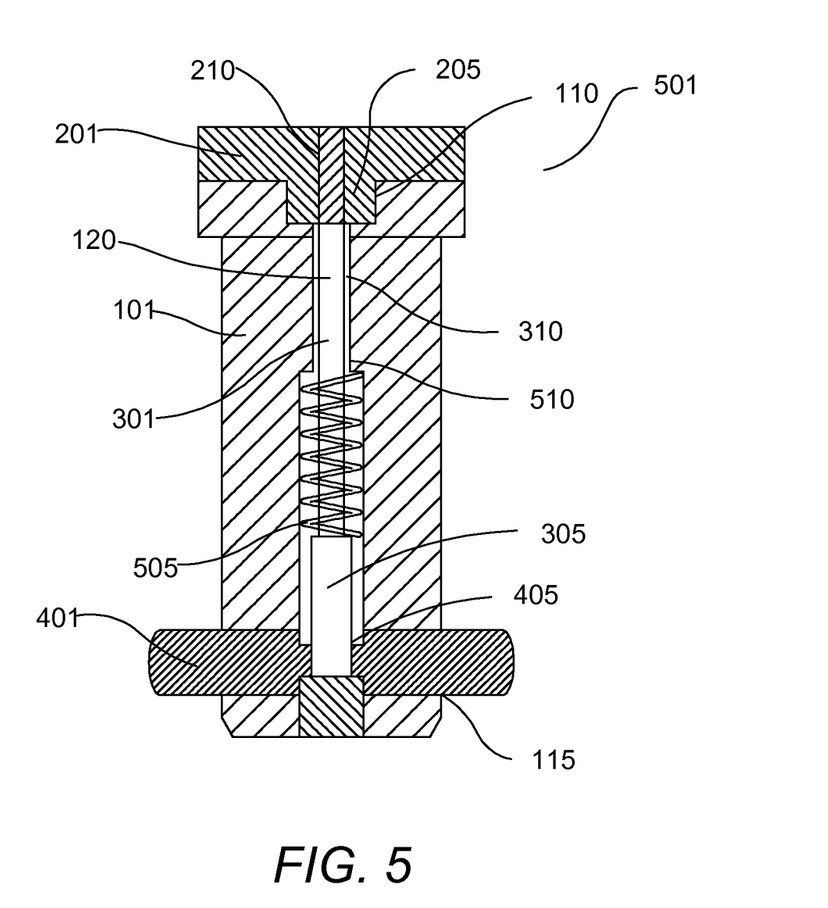
FIG. 5 is a cross sectional side view of an exemplary clevis pin, in accordance with an embodiment of the present invention.

FIG. 5 is a cross sectional side view of an exemplary clevis pin 501, in accordance with an embodiment of the present invention. In the present embodiment, clevis pin 501 comprises a clevis body 101 with an internal spring loaded plunger 301 and a fastener 401. Plunger 301 comprises a plunger shaft 310 of a diameter to fit freely though the inside diameter of a plunger spring 505 and freely through the smaller diameter of a head bore 120 in body 101. The top portion of plunger shaft 310 is also sized to afford a press fit within a cap bore 210 of a cap 201. The press fit attachment of plunger shaft 310 within cap 201 may be augmented with an adhesive or welding and typically positions plunger shaft 310 within cap 201 so that when a ridge 205 on cap 201 is completely inserted into a mating slot 110 in body 101, cap 201 is typically held in place by the compressive force of plunger spring 505. It is contemplated that in some embodiments either the adhesive augmentation or the press fit of the attachment of the plunger shaft to the cap may be eliminated. In the present embodiment, plunger 301 comprises a saddle 305 at the bottom end and may be actuated by plunger spring 505, which has roughly the same outside diameter as saddle 305 and roughly the same inside diameter as the outer diameter of plunger shaft 310 of plunger 301. Plunger spring 505 fits between saddle 305 and a step 510 of head bore 120 and may be of a length and gauge to produce sufficient force to firmly mate cap 201 into body 101 at one end and to firmly press saddle 305 into a circumferential groove 405 in fastener 401 at the other end. Saddle 305 mates with circumferential groove 405 of fastener 401, typically without the use of tools, to generally hold fastener 401 in place in a bore 115 of clevis pin body 101. Furthermore, the attachment of plunger shaft 310 to cap 201 is oriented such that when the ridge 205 on cap 201 is aligned with the mating slot 110 in body 101 the saddle 305 fits into the circumferential groove 405 of the fastener 401. Those skilled in the art will readily recognize, in light of and in accordance with the teachings of the present invention, that the elements of clevis pin 501 may be made of a multiplicity of suitable materials such as, but not limited to, various different metals, plastics or composite materials. For example, without limitation, clevis pin body 101 and cap 201 may be made from a highly corrosive resistant metal such as, but not limited to, type 316 stainless steel or titanium, and plunger 301 and fastener 401 may be made from a corrosive resistant and harder or hardenable stainless steel such as, but not limited to, Type 17-4. Also, plunger spring 505 may be made from a corrosion resistant stainless suitable for the fabrication of compression springs. Some embodiments may be capable of functioning in a corrosive environment including, without limitation, a marine environment or in an exterior application; however other embodiments may be made of non-corrosive resistant materials.

Figure 6A:
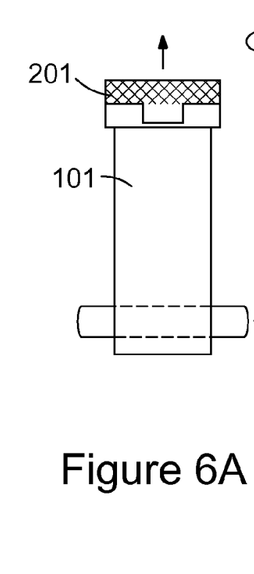
FIGS. 6A through 6E illustrate exemplary steps in a method of use of a clevis pin, in accordance with an embodiment of the present invention.
Figure 6B:
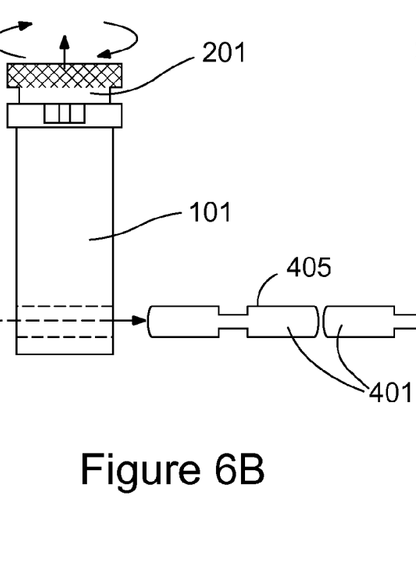
Figure 6C:
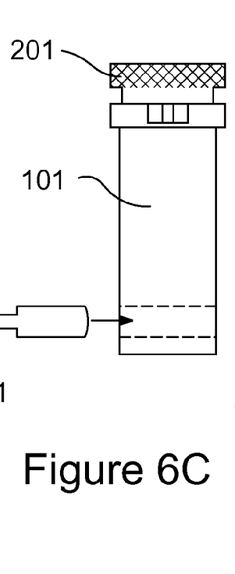
Figures 6D, 6E:
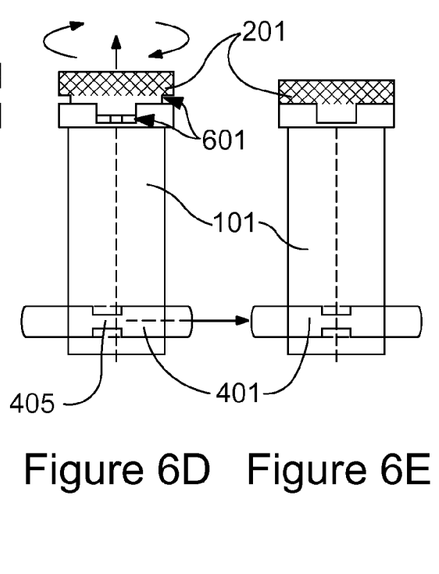

FIGS. 6A through 6E illustrate exemplary steps in a method of use of a clevis pin, in accordance with an embodiment of the present invention. In the present embodiment, referring to FIG. 6A, retraction of a cap 201 and the attached plunger, not shown, away from a clevis pin body 101 against the force of a compression spring within body 101 removes a ridge on cap 201 from a slot in body 101. Referring to FIG. 6B, a slight twisting motion of the retracted cap 201 relative to body 101 can fix cap 201 and the attached plunger in a retracted position. With this motion a saddle on the end of the internal plunger is completely retracted from a circumferential groove 405 at the middle portion of a fastener 401. This unlocks fastener 401 from body 101 to generally enable fastener 401 to be removed from body 101. In some applications a user may retract cap 201 and remove fastener 401 without twisting cap 201 into a locked, retracted position. Instead, the user may simply hold cap 201 away from body 101 in the retracted position while cotter pin substitute is removed. To lock fastener 401 into body 101 the motion is reversed. Referring to FIG. 6C, fastener 401 is inserted into body 101 in a roughly centered position with cap 201 in the retracted position. Referring to FIG. 6D, cap 201 is twisted or released to engage the ridge on cap 201 with the slot in body 101. The force of the internal compression spring typically snaps cap 201 into place so that a saddle at the lower end of the plunger mates into circumferential groove 405 of fastener 401. Referring to FIG. 6E, there is typically no gap between cap 201 and body 101 if fastener 401 is securely locked into the clevis pin. If any gap 601 remains between cap 201 and body 101, as shown by way of example in FIG. 6D, a slight push on the ends of fastener 401 typically aligns the saddle on the plunger with groove 405 in fastener 401, allowing complete engagement of the parts so that clevis pin is in the locked position with fastener 401 fixed securely into body 101. In the unlikely event of mechanical failure, for example, without limitation, failure of the internal spring or detachment of the cap from the spring loaded plunger, the clevis pin remains securely locked. This is because locking of the clevis pin is a function of the compressive force of the locking plunger spring 505. This spring, held captive between the larger diameter of the head bore 120 and the plunger shaft 701, even with failure of the spring continues to exert compressive force essentially unchanged. The cap 201 functions as an aid to retract the plunger for unlocking and during locking guides the saddle on plunger 305 into the groove 405 in the fastener 401. Once locked the cap whether present, absent, or displaced due to failure of the attachment of the plunger shaft to the cap has no effect on the security of the locking of the fastener 401. This security instead comes from the compressive force of the spring on the plunger saddle pushing against the step of the clevis body.

In typical use of the present embodiment, the clevis pin requires no tools to operate, is normally easy to use, even in conditions of limited access or low light, and generally does not damage fingernails. Furthermore, fastener 401 comprises smooth surfaces that may minimize the chance of being snagged so as to cause inadvertent release or damage to contacting objects, and the secure locking of fastener 401 within body 101 generally prevents release of fastener 401 by external (compressive) pressure on the head of the clevis pin. In the present embodiment, the clevis pin does not have a critical working length or working diameter. In the present embodiment, the head of the clevis pin is not prominent, which may minimize the chance of being snagged or simply getting in the way. Fastener 401 can be freed from body 101 for removal with a simple retraction and optional twisting motion of cap 201 by typically overcoming the force of the locking spring and disengaging the ridge on cap 201 from the slot in body 101 and can be locked into body 101 by a simple twisting or releasing motion of cap 201 by the force of the locking spring pulling the ridge on cap 201 into the slot in body 101 and aligning the saddle at the end of the spring loaded plunger into circumferential groove 405 in fastener 401. In the present embodiment, the clevis pin generally maintains the basic shape of a common clevis pin and the robustness of a common cotter pin. However, it is contemplated that clevis pins and cotter pin substitutes in some alternate embodiments may be made in a multiplicity of suitable shapes and sizes. For example, without limitation, the clevis pin may have a rectangular or hexagonal cross section rather than a circular cross section, or a smaller and less robust cotter pin substitute may be used.

Figure 7:
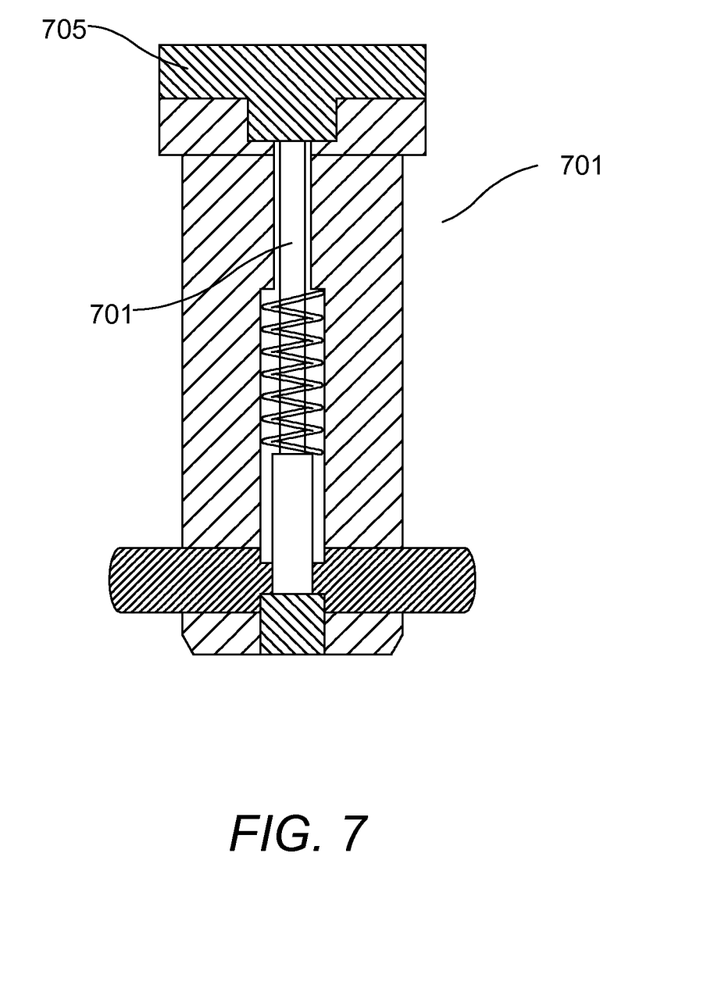
FIG. 7 is a cross sectional side view of an exemplary clevis pin, in accordance with an embodiment of the present invention.

FIG. 7 is a cross sectional side view of an exemplary clevis pin 701, in accordance with an embodiment of the present invention. In the present embodiment, a spring loaded plunger 705 is not inserted into a cap 710 to create a press fit. In the present embodiment plunger 705 may be attached to cap 710 by various different means including, without limitation, adhesives, welding, magnets, screws, bolts, etc. Those skilled in the art will readily recognize, in light of and in accordance with the teachings of the present invention, that some alternate embodiments may be implemented without a cap or with actuation means other than a cap such as, but not limited to, a knob or handle on the end of the plunger, a switch, a push button, etc.

Figure 8A:
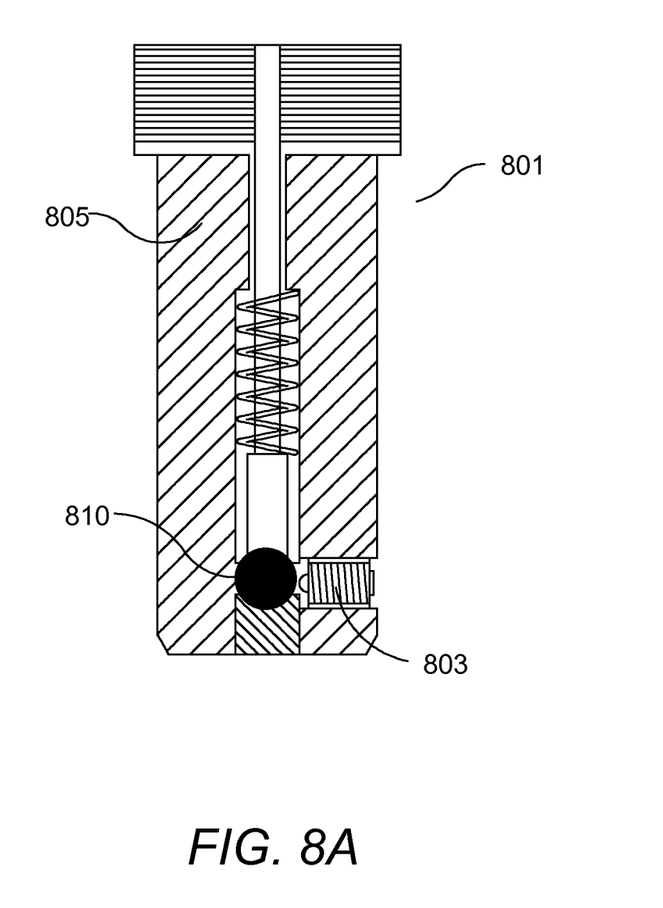
FIGS. 8A and 8B are cross sectional side views of an exemplary clevis pin, in accordance with an embodiment of the present invention.
Figure 8B:
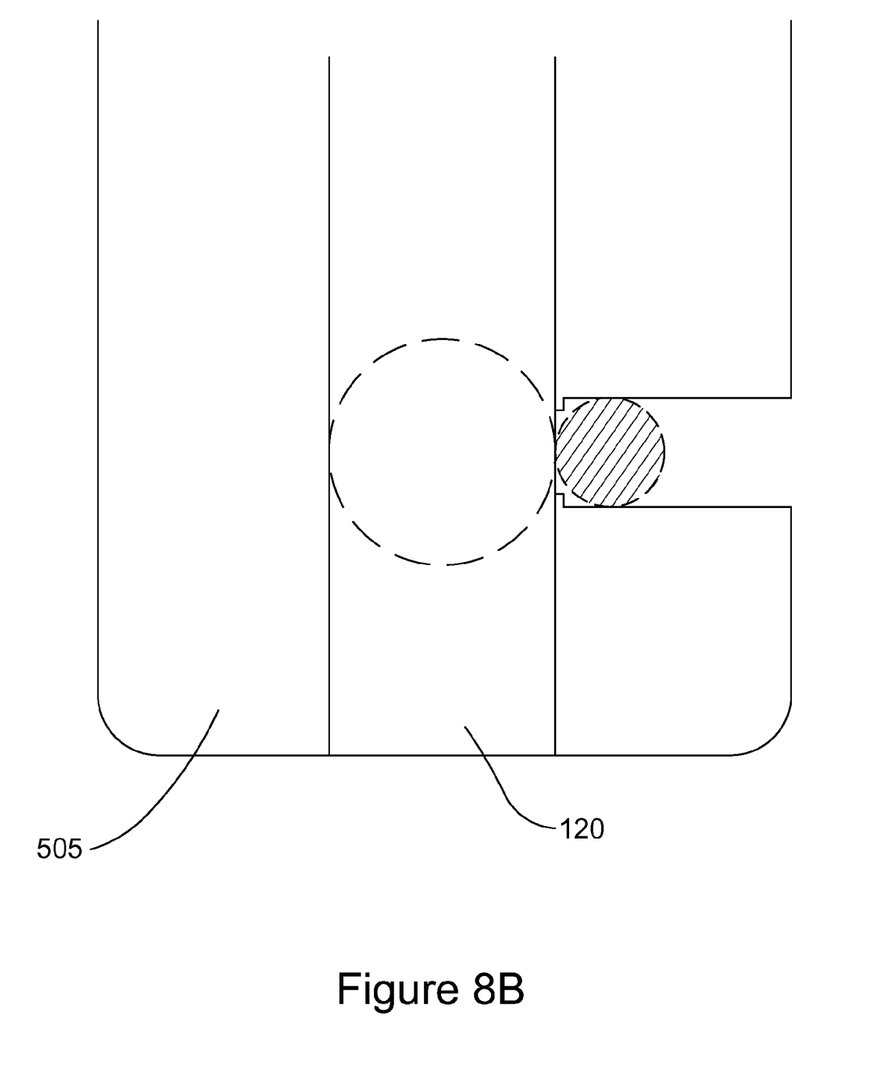

FIGS. 8A and 8B are cross sectional side view of an exemplary clevis pin 801, in accordance with an embodiment of the present invention. In the present embodiment, clevis pin 801 comprises a compressive element 803, 804 incorporated into a clevis pin body 805, which may help in preventing loss of a cotter pin substitute 810 during insertion or removal. The compressive element 803, 804 shown in FIG. 8A or 8B respectively, protrudes slightly into the large diameter head bore 120 FIG. 6 of the clevis body at its intersection with the cross bore 115 FIG. 5 near the bottom end of the clevis body 805 (FIGS. 1a and 1b). When the fastener 401 is inserted into the end of the clevis body the full diameter portion of the cotter pin will be held gently in the end of the clevis body by this compressive element. This is a temporary storage position useful during the initial deployment of the device and also during removal of the device. Insofar as the protuberance of the compressive element is only 10% or 15% of the bore, it exerts no pressure on the special fastener 401 when aligned with the circumferential groove 405 as is the case when the device is in the fully locked state. When the device is unlocked and the special cotter pin may begin to slide out of the cross bore 115. For example, without limitation, gravity may restrict this motion while the compressive element contacts the full diameter of the special cotter pin.

Those skilled in the art will readily recognize, in light of and in accordance with the teachings of the present invention, that some embodiments may be implemented with various different locking means. For example, without limitation, it is contemplated that in some embodiments, the fixation of the cotter pin substitute into the clevis pin body may be accomplished with a blunt end on the plunger impinging onto a cotter pin substitute without a circumferential groove or onto a cotter pin substitute with a circumferential groove. Other embodiments may comprise a plunger that fits into a hole or a slot in the cotter pin substitute.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing a clevis pin and a cotter pin substitute that typically requires no tools to apply according to the present invention will be apparent to those skilled in the art. Various aspects of the invention have been described above by way of illustration, and the specific embodiments disclosed are not intended to limit the invention to the particular forms disclosed. The particular implementation of the clevis pin and cotter pin substitute may vary depending upon the particular context or application. By way of example, and not limitation, the clevis pin and cotter pin substitute described in the foregoing were principally directed to spring loaded implementations; however, similar techniques may instead be applied to clevis pins with plungers that are actuated using various different means such as, but not limited to, a threaded plunger that may be screwed into or out of the body of the clevis pin or a ratcheting mechanism, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A device comprising:
    a shaft, said shaft comprising a cross bore, said cross bore being disposed to intersect a longitudinal axis of said shaft;
    a fastener, said fastener being configured to have substantially smooth terminal ends, said fastener being disposed to at least partially pass through said cross bore, said fastener comprising a groove;
    a head, said head being disposed to integrally join with one end of said shaft, said head comprising a slot, said slot comprising a head bore, said head bore being disposed to position in a central coaxial orientation to said shaft;
    a cap, said cap being disposed to detachably join with said head, said cap being configured to be substantially non-protuberant, said cap comprising a ridge, said ridge being configured to engage said slot, said cap further comprising a cap bore, said cap bore being disposed to position in a central coaxial orientation to said head bore;
    a plunger, said plunger comprising a plunger shaft, said plunger shaft being disposed to pass through said shaft, said plunger further comprising a saddle, said saddle being disposed to position on one end of said plunger, said saddle being configured to mate with said groove;
    a plunger spring, said plunger spring being disposed to at least partially receive said plunger shaft, said plunger spring comprising a compressive force sufficient for at least partially pressing said saddle against said groove, said plunger spring further comprising a compressive force sufficient for at least partially pressing said head against said cap, said compressive force being operable to substantially reduce when said cap at least partially detaches from said head; and
    a compressive element, said compressive element being disposed to at least partially protrude though an intersection of said cross bore and said head bore, said compressive element being operable to help secure said fastener in proximity to said intersection for at least partially providing a storage space for said fastener.

2. The device of claim 1, in which said device comprises a clevis pin.

3. The device of claim 1, in which said fastener comprises a cotter pin.

4. The device of claim 1, wherein said shaft is operable to pass through a clevis for carrying a load.

5. The device of claim 1, wherein said fastener is operable to secure said shaft into position with said clevis.

6. The device of claim 1, in which said cross bore comprises a diameter slightly larger than said fastener.

7. The device of claim 1, wherein said cross bore is disposed to be central axially oriented.

8. The device of claim 1, wherein said slot is configured wider and deeper than said ridge.

9. The device of claim 1, wherein said plunger shaft is configured with a smaller diameter than said plunger spring.

10. The device of claim 1, wherein said compressive force is proportional to a length and a gauge of said plunger spring.

11. The device of claim 1, wherein said fastener is operable to detach from said shaft when said compressive force at least partially reduces.

12. The device of claim 1, wherein rotation of said cap in a first direction urges said plunger spring in a downward direction for forming a press fit attachment between said cap and said head, said press fit attachment further comprising an adhesive.

13. The device of claim 1, wherein said groove is disposed to be centrally located on said fastener.

14. The device of claim 1, in which said groove comprises a substantially U-shape.

15. The device of claim 1, in which said compressive element comprises a ball spring.

16. The device of claim 15, wherein said ball spring is disposed to position inside said shaft in proximity to said cross bore.

17. The device of claim 16, wherein said ball spring is operable to press against said fastener.

18. The device of claim 17, wherein said ball spring is operable to at least partially provide a storage space for said fastener.

19. A device consisting of:
    a shaft, said shaft comprising a clevis pin, said shaft being operable to pass through a clevis for carrying a load, said shaft further comprising a cross bore, said cross bore being disposed to intersect a longitudinal axis of said shaft;
    a fastener, said fastener comprising a cotter pin, said fastener being operable to secure said shaft into position with said clevis, said fastener being configured to have substantially smooth terminal ends, said fastener being disposed to at least partially pass through said cross bore, said fastener comprising a groove, said groove being disposed to be centrally located on said fastener, said groove comprising a substantially U-shape;
    a head, said head being disposed to integrally join with one end of said shaft, said head comprising a slot, said slot comprising a head bore, said head bore being disposed to position in a central coaxial orientation to said shaft;
    a cap, said cap being disposed to detachably join with said head, said cap being configured to be substantially non-protuberant, said cap comprising a ridge, said ridge being configured to engage said slot, said cap further comprising a cap bore, said cap bore being disposed to position in a central coaxial orientation to said head bore;
    a plunger, said plunger comprising a plunger shaft, said plunger shaft being disposed to pass through said shaft, said plunger further comprising a saddle, said saddle being disposed to position on one end of said plunger, said saddle being configured to mate with said groove;
    a plunger spring, said plunger spring being disposed to at least partially receive said plunger shaft, said plunger spring comprising a compressive force sufficient for at least partially pressing said saddle against said groove, said plunger spring further comprising a compressive force sufficient for at least partially pressing said head against said cap, said compressive force being operable to substantially reduce when said cap at least partially detaches from said head; and
    a compressive element, said compressive element being disposed to at least partially protrude though an intersection of said cross bore and said head bore, said compressive element being operable to help secure said fastener in proximity to said intersection for at least partially providing a storage space for said fastener, said compressive element comprising a ball spring.

* * * * *